(12) United States Patent
Chang et al.

(10) Patent No.: US 7,433,522 B2
(45) Date of Patent: Oct. 7, 2008

(54) JBIG CODING APPARATUS AND METHOD WITH LOW COST, HIGH-PERFORMANCE PING-PONG BUFFER ARRANGEMENT

(75) Inventors: Jyh-Kai Chang, Hsin-Chu (TW); Wen-Cheng Ho, Hsin-Chu (TW)

(73) Assignee: Sunplus Technology Co., Ltd., Hsin-Chu (TW)

( * ) Notice: Subject to any disclaimer, the term of this patent is extended or adjusted under 35 U.S.C. 154(b) by 501 days.

(21) Appl. No.: 11/106,989

(22) Filed: Apr. 15, 2005

(65) Prior Publication Data
US 2006/0233444 A1 Oct. 19, 2006

(51) Int. Cl.
*G06K 9/36* (2006.01)

(52) U.S. Cl. .................. 382/232; 382/233; 382/266; 358/539; 375/240.13

(58) Field of Classification Search .................. 382/232
See application file for complete search history.

(56) References Cited
U.S. PATENT DOCUMENTS

| | | | | | |
|---|---|---|---|---|---|
| 5,363,219 | A | * | 11/1994 | Yoshida | ..................... 358/539 |
| 5,764,373 | A | * | 6/1998 | Matoba et al. | ............... 382/232 |
| 5,912,742 | A | * | 6/1999 | Matoba et al. | ............... 382/233 |
| 5,917,956 | A | * | 6/1999 | Ohsawa et al. | ............... 382/266 |
| 6,157,676 | A | * | 12/2000 | Takaoka et al. | ......... 375/240.13 |
| 6,577,768 | B1 | * | 6/2003 | Ushida | ....................... 382/238 |
| 7,221,483 | B2 | * | 5/2007 | Yagishita et al. | ........... 358/3.13 |
| 2002/0024525 | A1 | | 2/2002 | Ushida | |

* cited by examiner

*Primary Examiner*—Samir A Ahmed
*Assistant Examiner*—Aklilu K Woldemariam
(74) *Attorney, Agent, or Firm*—Bacon & Thomas, PLLC

(57) ABSTRACT

The present invention provides an image coding apparatus and method, which can achieve a low-cost, real time, and high-performance coding process by utilizing a line buffer and an auxiliary buffer to execute a typical prediction process in JBIG encoding, a ping-pong buffer and a window template, and an adaptive encoder/decoder. The image encoding apparatus includes a typical prediction unit for storing input image data and performing typical predication in JBIG encoding of the input image data, a ping-pong buffer unit which has a plural sets of line memories for sequentially updating and storing the image data into corresponding addresses of the plural sets of line memories, and generating a template, a encoding unit for reading out the image data stored in the ping-pong buffer, and performing adaptive arithmetic encoding, and a control unit for controlling access to the ping-pong buffer unit between the typical prediction unit and the encoding unit.

12 Claims, 5 Drawing Sheets

FIG. 4

JBIG CODING APPARATUS AND METHOD WITH LOW COST, HIGH-PERFORMANCE PING-PONG BUFFER ARRANGEMENT

BACKGROUND OF THE PRESENT INVENTION

1. Field of Invention

The present invention relates to an image processing apparatus and method having compression/decompression function for image data, and more particularly to an image processing apparatus and method for high-performance and real time conversion of image data by the JBIG (Joint Bi-level Image Experts Group) standard utilizing the ping-pong buffer and line buffer to generate necessary context.

2. Description of Related Arts

Please refer to the prior art described in U.S. Pub. No. 20020024525. As shown in FIG. 1 of U.S. Pub. No. 20020024525, it illustrates a hardware block diagram of a typical sequential JBIG process. Referring to FIG. 1, reference numerals 101 to 104 denote line buffers which sequentially update and store image data for one line in synchronism with clocks (not shown), thus outputting image data for four lines including a line to be encoded and reference lines for template generation to a TP discriminator 105 and adaptive arithmetic encoder 107.

Image data input from an input terminal 100 at a rate of one pixel/clock in synchronism with transfer clocks (not shown) is stored in the line buffer 101. The line buffer 101 stores the data, and simultaneously reads out image data for the previous line and outputs it to the line buffer 102 in synchronism with the transfer clocks. The line buffer 102 stores the data output from the line buffer 101 in synchronism with the transfer clocks, and simultaneously reads out the stored data for the previous line and outputs it to the line buffer 103, as in the line buffer 101. In this manner, data are sequentially transferred to the line buffers 102, 103, and 104 while being updated, thus simultaneously extracting delayed data for four lines from the memories. In this example, the data read out from the line buffer 102 corresponds to the line to be encoded.

Reference numeral 105 denotes a TP (typical prediction) discriminator for comparing data read out from the line buffer 101 and data of the immediately above line read out from the line buffer 102 for one line so as to check if data for one line, which is read out from the line buffer 101 and is stored in the line buffer 102, allows typical prediction. A discrimination result indicating whether data allows typical prediction (LNTPy=0) or not (LNTPy=1) is output to a register 106 every time a process for one line is completed, and is held in the register to update the register value. Reference numeral 107 denotes an adaptive arithmetic encoder for receiving data for three lines, which are read out from the line buffers 102, 103, and 104, and generating template data corresponding to a pixel to be encoded using shift registers (not shown). The adaptive arithmetic encoder makes an adaptive arithmetic coding operation of the pixel to be encoded using this template data, thus generating and outputting encoded data. At the head of each line, a temporary pixel is computed using the register value held in the register 106, and an adaptive arithmetic coding operation is made using a fixed template therefor so as to encode the typical prediction result by adaptive arithmetic coding, thus generating and outputting encoded data.

However, since the prior art implements the TP (typical prediction) process by hardware, as shown in FIG. 1 of U.S. Pub. No. 20020024525, four line buffer memories for reference lines are required for the TP process, thus increasing the hardware scale. Furthermore, in the example shown in FIG. 1 of U.S. Pub. No. 20020024525, since all the line buffer memory update process, TP discrimination process, and adaptive arithmetic coding operation are parallelly executed in synchronism with identical clocks, each line to be encoded requires a processing time given by the number of pixels for one line.times.clocks although the TP process that can reduce the number of pixels to be encoded if they allow typical prediction and that can achieve high-speed processing is used.

Accordingly, according to the prior art described in U.S. Pub. No. 20020024525, there are at least one line buffer memory for processing TP, and three line buffer memories for processing context, wherein the TP memory and the context memory are sequentially assembled for later purposes. Therefore, there are at least four line buffers necessary for processing TP (typical predication) and combining the context, a rather larger memory will be required for accomplishing such tasks. Furthermore, when the high resolution image is processed, the SRAM will eaten up as octuple as much, that is to say, more SRAM would be occupied by such JBIG system. What is more, it is awesomely time-consuming for wait such TP (typical prediction), as well as the context are forwarded to the adaptive arithmetic encoder, which is intolerable for most of users.

SUMMARY OF THE PRESENT INVENTION

A primary object of the present invention is to provide a JBIG coding apparatus and method with ping-pong buffer arrangement for compressing/decompressing data by adaptive arithmetic operations using typical prediction as a pre-process to economize the use of memory and increase the performance, wherein the typical prediction operation and the ping-pong buffer operation could be are parallelly executed so as to increase the performance.

Another object of the present invention is to provide a buffer arrangement for a JBIG coding apparatus, wherein the buffer arrangement comprises two separate buffers for the JBIG encoder/decoder, namely, a line buffer and an auxiliary buffer, which could execute a typical prediction process just only use of the line buffer and the auxiliary buffer.

Another object of the present invention is to provide a buffer arrangement and a ping-pong buffer as well as a window unit for JBIG coding apparatus and method for performing coding by optimizing a coding efficiency in accordance with image data.

Another object of the invention is to provide a coding apparatus and method capable of efficiently performing task processes in units of a predetermined time in accordance with image data.

Another object of the present invention is to provide a ping-pong buffer as well as a window unit of processing the high resolution image, wherein a line buffer is further prolonged while other memory arrangement are intact, so that no more substantial memory body are necessary.

Another object of the present invention is to provide a buffer arrangement and a ping-pong buffer as well as a window unit for processing the high resolution image, wherein the size of the ping-pong buffer is adjustable based on the speed of the arithmetically encoding speed of the adaptive arithmetic encoder for achieving high efficiency operation of the JBIG coding process and reducing the use of the memory size.

Another object of the present invention is to utilize a buffer arrangement and ping-pong buffer to generate a necessary context in order to reduce the time consumption of generating a necessary context for achieving a low-cost, real time, and high efficiency operation of JBIG coding process.

Accordingly, in order to achieve above mentioned objects, the present invention provides an image encoding apparatus, comprising:

a typical prediction unit for storing input image data, and performing typical predication in JBIG encoding of the input image data;

a ping-pong buffer unit which has a plural sets of line memories for sequentially updating and storing the image data into corresponding addresses of the plural sets of line memories, and generating a template;

a encoding unit for reading out the image data stored in the ping-pong buffer, and performing adaptive arithmetic encoding; and a control unit for controlling access to the ping-pong buffer unit between the typical prediction unit and the encoding unit.

These and other objectives, features, and advantages of the present invention will become apparent from the following detailed description, the accompanying drawings, and the appended claims.

BRIEF DESCRIPTION OF THE DRAWINGS

FIG. 4 illustrates a sequential Window-based JBIG compression according to the above preferred embodiment of the present invention.

DETAILED DESCRIPTION OF THE PREFERRED EMBODIMENT

Figure 1:
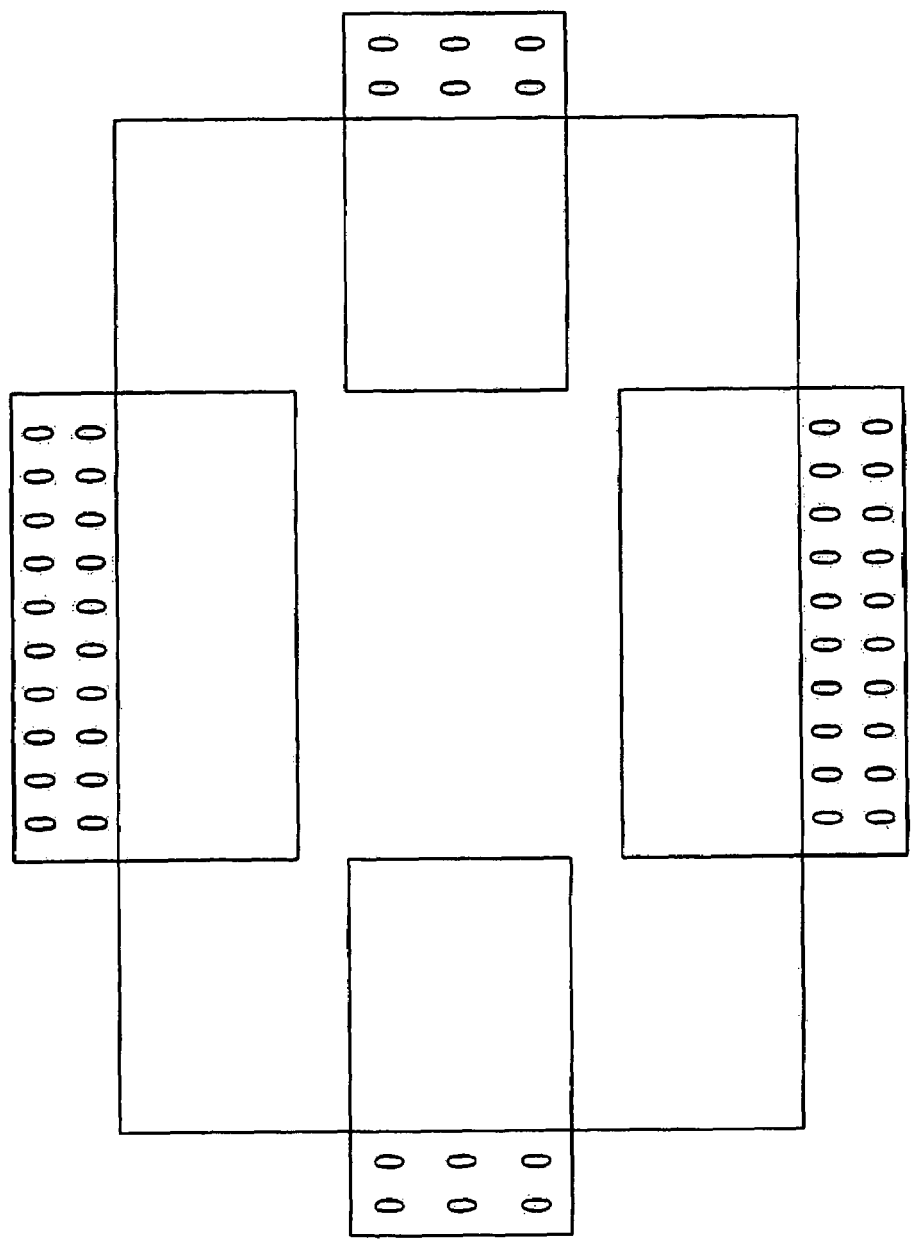
FIG. 1 is a schematic view showing a bi-level image.

Referring to FIG. 1, a bi-level image is illustrated, the edge area of such image could be deemed pixel with a background color (white=0), for facilitating the compression of the image, according to the present invention, the pixel value of each of the line buffer is identical with the previous line buffer. If the pixel value is the same, the Typical prediction value (LNTP) is 0, however, if any of pixel is showing different value, the LNTP is 1, so each of the line has a corresponding Typical prediction value (LNTP). In other words, in sequential JBIG, if the line to be encoded matches the immediately above line, it is determined that the line of interest is typical, and $LNTP_y=0$ is set. If the line to be encoded is different from the immediately above line even by one pixel, it is determined that the line of interest is not typical, and $LNTP_y=1$ is set. Upon encoding a head line of an image, the immediately above line is assumed to be background color (white=0), thus making comparison for typical prediction.

If the previous line's Typical prediction value is $LNTP_{y-1}$, and the current scan line's Typical prediction value is $LNTP_y$, so in the very beginning, the Typical prediction value of such line as well as a fixed set of context will be send into the adaptive arithmetic encoding to be compressed, wherein $SLNTP_y=!(LNTP_y \text{ XOR } LNTP_{y-1})$, if the value is the same, a following procedure will be followed to compare pixel value of the line buffer, no data would be send into the adaptive arithmetic encoder, this is due to the fact that each line has to be processed by the adaptive arithmetic encoder first.

Figure 2:
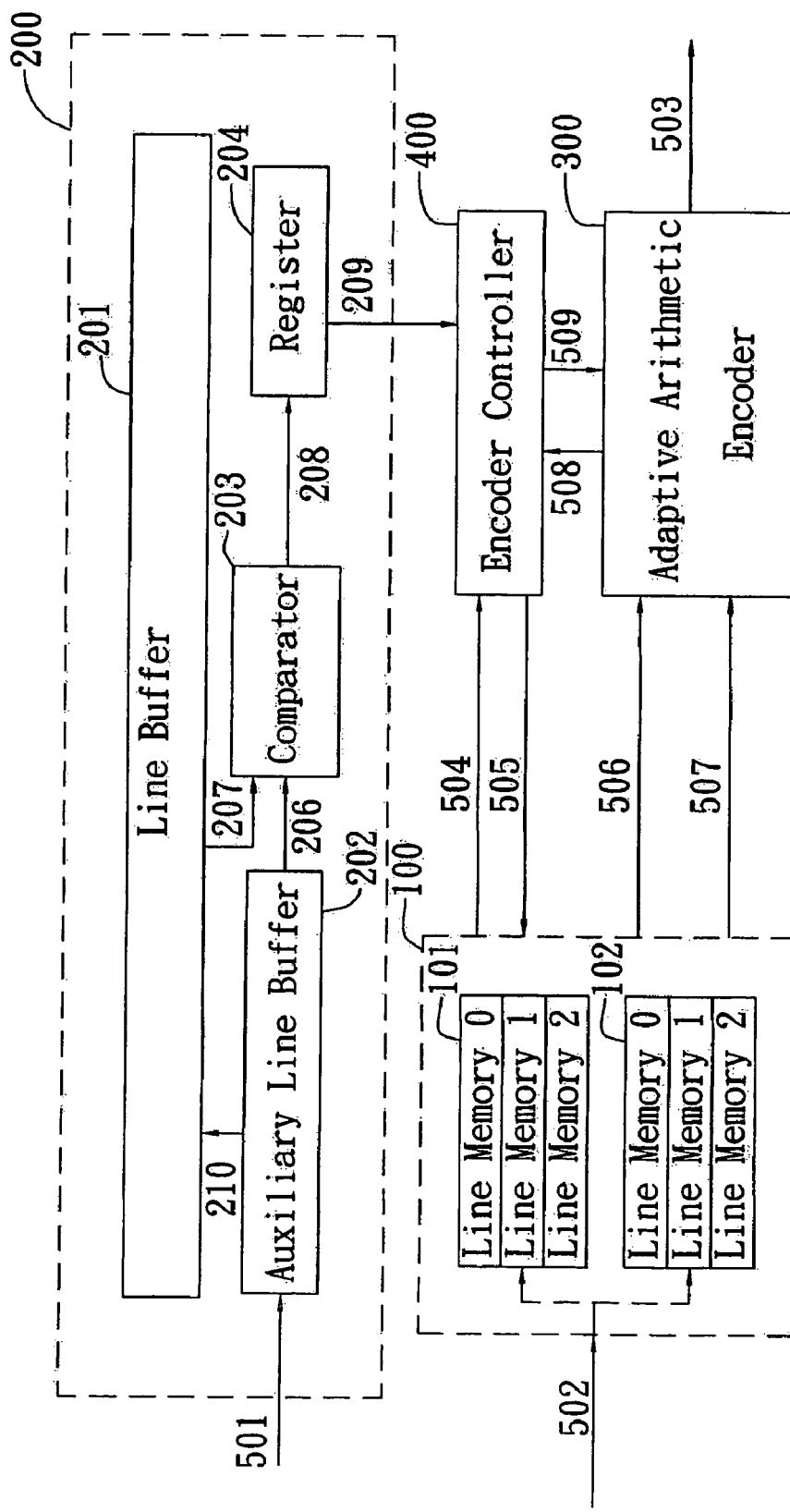
FIG. 2 is a block diagram showing the arrangement of an encoding apparatus according to a preferred embodiment of the present invention.

FIG. 2 is a block diagram showing the arrangement of an encoding apparatus according to a preferred embodiment of the present invention. Traditionally, as described in U.S. Pub. No. 2002/0024525, the JBIG is compressed by two line buffers to process TP prediction of the JBIG, and data of the previous line buffer will be maintained for later comparison with data of the current line buffer so as to decide the TP value. However, if a high resolution image is processed, a relatively larger memory would be needed for processing such JBIG compression. According to the present invention, the memory element is embodied as two separated line memory, namely, a line buffer 201 and an auxiliary line buffer 202. The auxiliary line buffer 202 could be 32 bytes or 64 bytes so that 32 bytes or 64 bytes of data could be retrieved from an image memory (not shown) through DMA (Direct Memory Access) via a first DMA channel 501, and stored into such auxiliary line buffer 202. In the beginning, the line buffer 210 is set to zero. The auxiliary line buffer 202 could be retrieved from an image memory (not shown) through DMA (Direct Memory Access) via the first DMA channel 501, and stored into such auxiliary line buffer 202. Afterwards, the image data stored in such auxiliary line buffer 202 could be read out via a signal line 206 and compared with the data of the line buffer 201 via a signal line 207 through a comparator 203. If the comparison result is different, the current line's LNTP value will be reset. The comparator 203 outputs the LNTP value of the current line, wherein such value should be stored into a register 204. Once the comparator 203 outputs the LNTP value of the current line, the data of the auxiliary buffer 202 update and store image data into corresponding address of the line buffer 201 in synchronism with clocks (not shown) via a signal line 210. Afterwards, the auxiliary line buffer 202 could be retrieved from the image memory through DMA (Direct Memory Access) via the first DMA channel 501, and stored into such auxiliary line buffer 202 again. Likewise, the image data stored in such auxiliary line buffer 202 could be read out via a signal line 206 and compared with the data of the line buffer 201 via a signal line 207 through a comparator 203. If the comparison result is different, the current line's LNTP value will be reset. The comparator 203 outputs the LNTP value of the current line, wherein such value should be stored into a register 204. The data of the auxiliary buffer 202 sequentially update and store image data into corresponding address of the line buffer 201 in synchronism with clocks (not shown) via the signal line 210, such repetition would not ceased until the current line buffer 201 is ended so as to obtain the LNTP values of the current line, such values should be stored into the register 204, meanwhile, data stored in the line buffer 201 will be rewritten into the current line for later reference.

Referring back to FIG. 2, a schematic view of the buffer arrangement of the preferred embodiment of the present invention is illustrated. The encoding buffer arrangement comprises an adaptive arithmetic encoder 300, a TP (typical prediction) unit 200 which includes the line buffer 201, the auxiliary line buffer 202, the comparator 203, and the set of register 204, a ping-pong buffer 100 which includes a 3-line memory 101 and a 3-line memory 102, a set of encode controller 400, and three set of DMA channel, namely a first DMA channel 501, a second DMA channel 502, and a third DMA channel 503. Data are sent into the auxiliary line buffer 202 via the first DMA channel 501 and to be compared with pixel value of line buffer 201 at corresponding position. If the data information is different, a LNTP value of the line buffer 201 is determined and then send into the register 204. Furthermore, after the comparing process, the pixel information stored in the auxiliary line buffer 202 will be written into a corresponding position in the line buffer 201 until the pixel line is fully scanned. In this example, the auxiliary line buffer 202 is a 128 byte SRAM. Nevertheless, the auxiliary line buffer 202 of this invention is not limited to a 128 byte SRAM.

The LNTP value will determine whether the current line is forwarded to the adaptive arithmetic encoder 300 or not. The second DMA channel 502 is adapted to grab necessary information and to send such information into the ping-pong buffer 100. Upon receiving the LNTP values, the encoder controller 400 communicates with the ping-pong buffer 100 via the signal lines 504 and 505 so that the encoder controller 400 determines whether data of the 3-line memory 101 or the 3-line memory 102 are forwarded to the adaptive arithmetic encoder 300 or not by the TP (Typical prediction) value, and the ping-pong buffer 100 sequentially update and store image data into corresponding address of the 3-line memory 101 or the 3-line memory 102 via the second DMA channel 502. In this manner, data are sequentially transferred to the line memories 0 to 3 to read out/write data from/in line memories 0 to 3 of the 3-line memory 101 or the line memories 0 to 3 to read out/write data from/in line memories 0 to 3 of the 3-line memory 102. Every time for one line is processed, image data are sequentially read out from line memories 0, 1, and 2 of the 3-line memory 101 or the 3-line memory 102 in response to an access request from the encoder controller 400. Likewise, when image data input from the second DMA channel 502 is written in the 3-line memory 101 in response to an access request from the encoder controller 400, image data are read out from the 3-line memory 102 and output to the adaptive arithmetic encoder 300. The adaptive arithmetic encoder 300 outputs an update due to line end to the encoder controller 400 via signals lines 508 and 509. In this example, the 3-line memory 101 or the 3-line memory 102 is a 384 byte SRAM. Nevertheless, the 3-line memory 101 or the 3-line memory 102 of this invention is not limited to a 384 byte SRAM. However, the size of the 3-line memory 101 or the 3-line memory 102 could be adjustable based on the speed of the arithmetically encoding speed of the adaptive arithmetic encoder. Hence the size of the ping-pong buffer could be adjustable based on the speed of the arithmetically encoding speed of the adaptive arithmetic encoder so that the present invention could utilize different size of the ping-pong buffer 100 to satisfy real conditions. In addition, the third DMA channel 503 is adapted to sending out the compressed data.

What is more, pertaining to the compression process in the adaptive arithmetic encoder 300, each line is started with a SLNTP value, representing the current line differing with the previous line, so that the current SLNTP value is associated with a fixed set of context so as to be send to the adaptive arithmetic encoder 300. In case the data of the current line is identical with the previous line, the adaptive arithmetic encoder 300 would not perform the compression process. If the comparison result is differed, the data of the current line should be forwarded to the adaptive arithmetic encoder 300 to be compressed.

According to the JBIG three-line template, the current line, the previous line and the next line should be referenced. The conventional method utilized three-line buffer to store pixels for combing to form the context. However, in case of a high resolution image is applied, such three-line buffer would eaten up a huge fraction of the memory. According to the above description, furthermore, when the high-resolution image is processed, the present invention could not consume a large amount of memory to perform JBIG compression process because of the ping-pong arrangement.

Accordingly, the present invention utilizes the TP (typical prediction) unit to determine whether the current line should be forwarded to the adaptive arithmetic encoder or not, and the ping-pong arrangement to economize the use of memory. Therefore, the present invention could provide a low cost and high performance JBIG coding apparatus and method with ping-pong arrangement.

Figure 3:
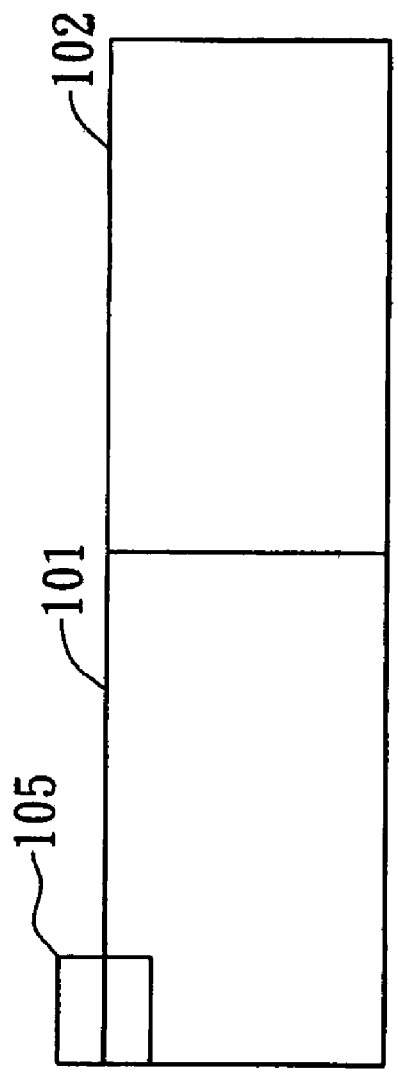
FIG. 3 shows the ping pong buffer according to the above preferred embodiment of the present invention.

Referring to FIG. 3, the ping pong buffer 100 according to the preferred embodiment of the present invention is illustrated. The image context is processed by window template 105, and processed by window shift mode. After such context is combined, the next patch of data will be processed. Therefore, the build-up context and the procedure of the arithmetic encoding process could be divided into two separate steps to speed up the processing speed. The window shift mode is applied to frame-by-frame outputting pixel value as well as corresponding context value, and then send such information into the adaptive arithmetic encoder.

Figure 4:
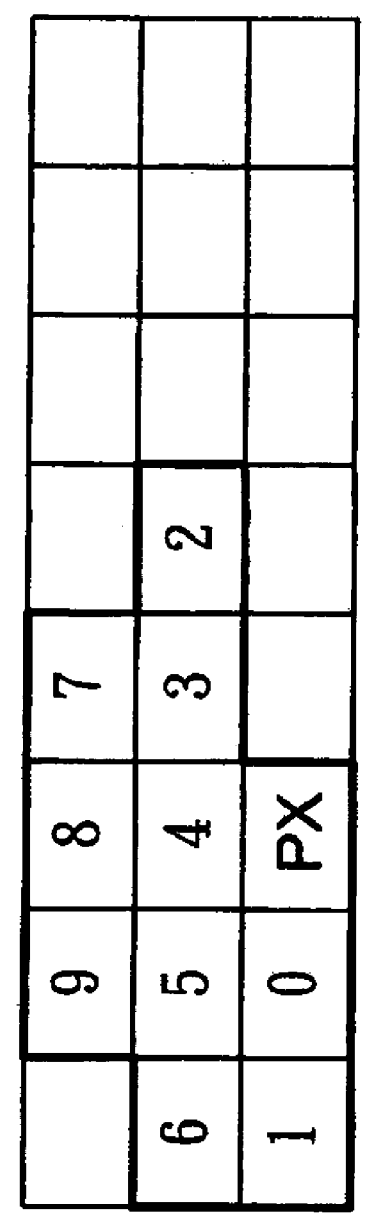

Referring to FIG. 4, a sequential Window-based JBIG compression is illustrated, wherein a neighborhood, surrounding pixels, around a pixel PX for each pixel to be coded defines a context CX so as to make arithmetic operations for dividing several straight lines from the result of the template, and update a learning table. The context CX is used to establish probability table. The context CX could be 2-line template or 3-line template. In this example, a 3-line template is done to generate a template for the adaptive arithmetic coding operation. The template is a 3*1 byte window unit as shown in FIG. 4.

The context CX is shown as below.

CX={bit9, bit8, bit7, bit6, bit5, bit4, bit3, bit2, bit1, bit0}

In this present invention, the pixel PX and the context CX are read out from the 3-line memory 101 or the 3-line memory 102 and output to the adaptive arithmetic encoder 300 via signal lines 506 and 507. Every time image data are read out from the 3-line memory 101 or the 3-line memory 102, the pixel PX and the context CX per time is sequentially shifted and output to the adaptive arithmetic encoder 300 by one bit. In other words, the pixel PX and the context CX from signal lines 506 and 507 at a rate of one pixel per time is output to the adaptive arithmetic encoder 300. The adaptive arithmetic encoding operation is made using this template and data of the pixel to be encoded, thus outputting encoded data onto the third DMA channel 503.

Figure 5:
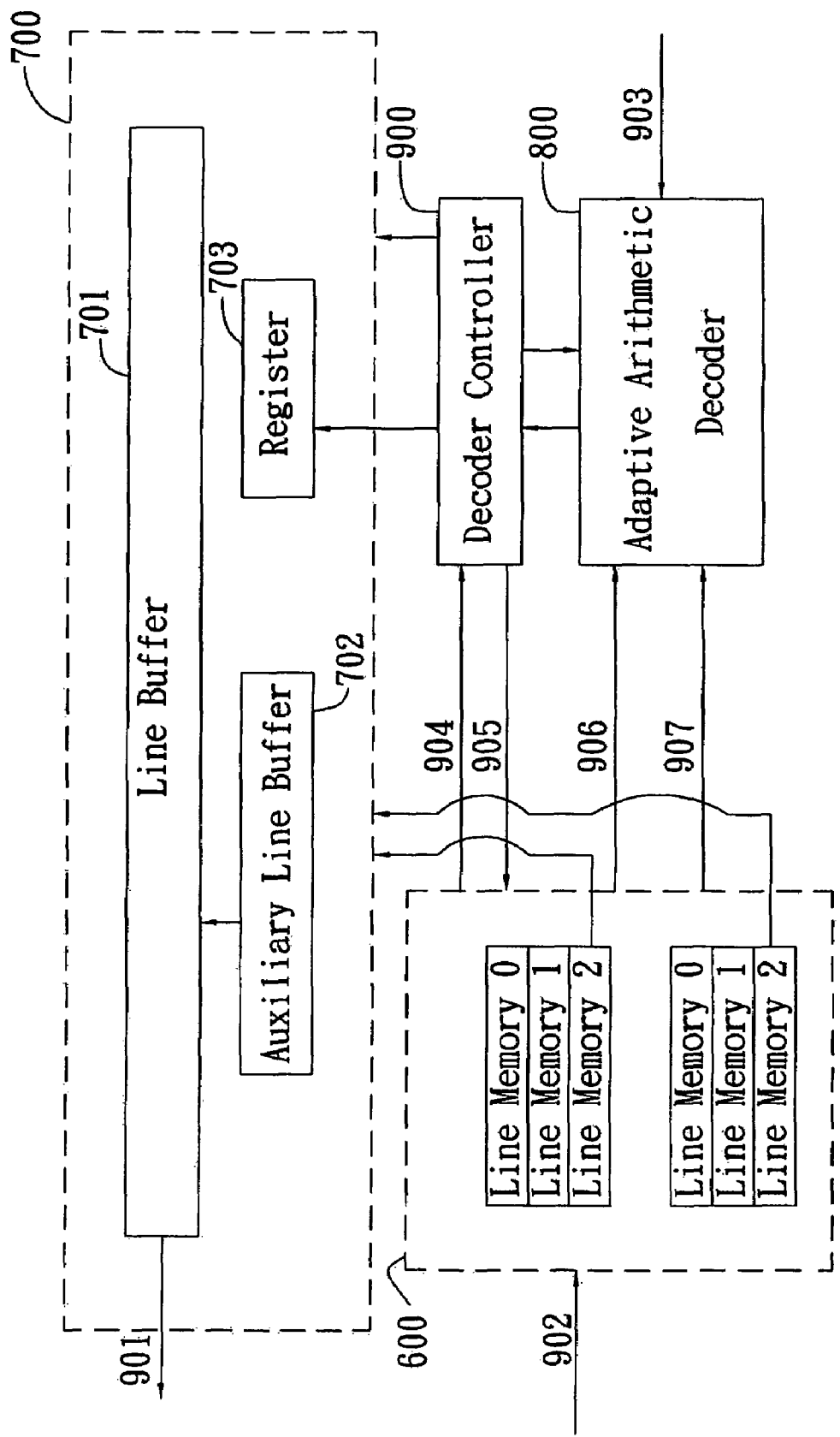
FIG. 5 illustrates a sequential JBIG decompression according to the preferred embodiment of the present invention.

Referring to FIG. 5, a sequential JBIG decompression is illustrated, wherein the decoding arrangement comprises an adaptive arithmetic decoder 800, a line buffer 701, an auxiliary buffer 702, a ping-pong buffer 600, a set of register 703, a set of decoder controller 900 and three set of DMA channel 901, 902, and 903, wherein data is send into the adaptive arithmetic decoder 800 via the third DMA channel 903 to obtain a SLNTP value. The SLNTP value is sent to the decoder controller 900 and then decoded to a LNTP value of the present line based on the SLNTP value and the LNTP value of the previous line. Afterwards, the LNTP value of the present line will be stored into the register 703 via the decoder controller 900. If the LNTP value shows that the line is not needed to be decoded, a previous line data stored in the line buffer 701 will be outputted. If the LNTP value shows that the current line is to be decoded, the previous two line data will be send into the ping-pong buffer 600 through the second DMA channel 902. Afterwards, the context CX are read out from the ping-pong buffer 600 and output to the adaptive arithmetic decoder 800 via signal lines 906 and 907. A window shift mode is applied to frame-by-frame scanning each pixel-combining context within the decode controller 900, to be send into the adaptive arithmetic decoder 800. Every time image data are read out from the ping-pong buffer 600, the context CX per time is sequentially shifted and output to the adaptive arithmetic decoder 800 by one bit. Each pixel value to be decoded is sent into the auxiliary buffer 702. The data of the auxiliary buffer 702 update and store image data into corresponding address of the line buffer 701 in synchronism with clocks (not shown), such repetition would not ceased until all one line has been completed, meanwhile, data stored in the line buffer 701 will be rewritten into an image memory (not shown) through DMA (Direct Memory Access) via the first DMA channel 901.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure form such principles. Therefore, this invention includes all modifications encompassed within the spirit and scope of the following claims.

What is claimed is:

1. An image encoding apparatus, comprising:
   a typical prediction unit for storing input image data, and performing typical predication in JBIG encoding of said input image data coding of said input image data, wherein the typical prediction unit includes;
   an auxiliary line buffer for retrieving said input image data via a first Direct Memory access (DMA) channel and storing said input image data;
   a line buffer for storing said image data of an immediately above line repeatedly read out from said auxiliary line buffer which has a size being a part of the line buffer; and
   a comparator for detecting by comparison between said auxiliary line buffer and said line buffer whether all pixels of said input image data match said image data of the immediately above line repeatedly read out from said auxiliary line buffer;
   a ping-pong buffer unit which has a first memory and a second memory, each having plural line memories for sequentially updating and storing said image data into corresponding addresses of said plural line memories via a second DMA channel, and generating a template;
   an encoding unit for reading out said image data stored in said ping-pong buffer unit, and performing adaptive arithmetic encoding on said image data and outputting encoded image data via a third DMA channel; and
   a control unit for controlling access to said ping-pong buffer unit between said typical prediction unit and said encoding unit.

2. The image encoding apparatus, as recited in claim 1, wherein said typical prediction unit further comprising: a register for holding results of said comparator in correspondence with said auxiliary line buffer and said line buffer.

3. The image encoding apparatus, as recited in claim 1, wherein in said ping-pong buffer unit, said first memory is a first three-line memory and said second memory is a second three-line memory for sequentially updating and storing said image data into corresponding addresses of said plural line memories, and generating said template, wherein when said image data is written in one of said three-line memories in response to an access request from said control unit, said image data of the immediately above line are read out from the other three-line memory and output to said encoding unit.

4. The image encoding apparatus, as recited in claim 2, wherein in said ping-pong buffer unit, said first memory is a first three-line memory and said second memory is a second three-line memory for sequentially updating and storing said image data into corresponding addresses of said plural line memories, and generating said template, wherein when said image data is written in one of said three-line memories in response to an access request from said control unit, said image data of the immediately above line are read out from the other three-line memory and output to said encoding unit.

5. The image encoding apparatus, as recited in claim 3, wherein said image data stored in said 3-line memories are used to generate said template for said adaptive arithmetic coding operation, wherein said template comprises a context and a pixel read out from said 3-line memories and said pixel and said context per time are sequentially shifted and output to said encoding unit by one bit.

6. The image encoding apparatus, as recited in claim 4, wherein said image data stored in said 3-line memories are used to generate said template for said adaptive arithmetic coding operation, wherein said template comprises a context and a pixel read out from said 3-line memories and said pixel and said context per time are sequentially shifted and output to said encoding unit by one bit.

7. The image encoding apparatus, as recited in claim 5, wherein said template is a 3*1byte window unit.

8. The image encoding apparatus, as recited in claim 6, wherein said template is a 3*1byte window unit.

9. An image encoding method, comprising the steps of:
   retrieving input image data via a first Direct Memory Access (DMA) channel and storing said input image data in a typical prediction unit having an auxiliary line buffer for storing said input image data, and
   a line buffer for storing said image data of an immediately above line repeatedly read out from said auxiliary line buffer which has a size being a part of the line buffer;
   performing typical predication in JBIG encoding of said input image data by a comparator for comparison between said auxiliary line buffer and said line buffer whether all pixels of said input image data match said image data of the immediately above line repeatedly read out from said auxiliary line buffer;
   controlling access to a ping-pong buffer unit which has a first memory and a second memory, each having plural line memories, for sequentially updating and storing said image data into corresponding addresses of said plural line memories via a second DMA channel, and generating a template; and
   controlling an encoding unit for reading out said image data stored in said ping-pong buffer, and performing adaptive arithmetic encoding on said image data and outputting encoded image data via a third DMA channel.

10. The image encoding method, as recited in claim 9, wherein said typical prediction unit further comprising:
    a register for holding results of said comparator in correspondence with said auxiliary line buffer and said line buffer.

11. The image encoding method, as recited in claim 9, wherein in said ping-pong buffer unit, said first memory is a first three-line memory and said second memory is a second three-line memory for sequentially updating and storing said image data into corresponding addresses of said plural line memories, and generating said template, wherein when said image data is written in one of said three-line memories in response to an access request from said control unit, said image data of the immediately above line are read out from the other three-line memory and output to said encoding unit.

12. The image encoding method, as recited in claim 11, wherein said image data stored in said 3-line memories are used to generate said template for the adaptive arithmetic coding operation, wherein said template comprises a context and a pixel read out from said 3-line memories and said pixel and said context per time are sequentially shifted and output to said encoding unit by one bit.

* * * * *